(12) United States Patent
Desmarais et al.

(10) Patent No.: US 9,961,834 B2
(45) Date of Patent: May 8, 2018

(54) VINE STRIPPING APPARATUS AND METHOD

(76) Inventors: Kerry T. Desmarais, Sunnyside, WA (US); Thomas Carpenter, Jr., Granger, WA (US); Craig A. Carpenter, Granger, WA (US)

(*) Notice: Subject to any disclaimer, the term of this patent is extended or adjusted under 35 U.S.C. 154(b) by 793 days.

(21) Appl. No.: 13/012,443

(22) Filed: Jan. 24, 2011

(65) Prior Publication Data

US 2011/0113740 A1    May 19, 2011

Related U.S. Application Data

(63) Continuation-in-part of application No. 12/319,984, filed on Jan. 13, 2009.

(51) Int. Cl.
    *A01D 46/02*    (2006.01)
    *A01D 33/06*    (2006.01)
    *A01D 45/16*    (2006.01)

(52) U.S. Cl.
    CPC ............. *A01D 46/02* (2013.01); *A01D 33/06* (2013.01); *A01D 45/16* (2013.01)

(58) Field of Classification Search
    CPC ......... A01D 45/16; A01D 33/06; A01D 46/02
    USPC .......... 131/314, 322, 313, 290; 460/134–140
    See application file for complete search history.

(56) References Cited

U.S. PATENT DOCUMENTS

| | | | |
|---|---|---|---|
| 19,688 A | | 3/1858 | Dickey |
| 1,518,349 A | * | 12/1924 | Olson ........................... 460/137 |
| 1,723,492 A | | 8/1929 | Ryder |
| 2,356,545 A | | 8/1944 | Sykora |
| 3,437,152 A | * | 4/1969 | Barrentine ....................... 171/58 |
| 3,724,184 A | | 4/1973 | Wright |
| 3,731,475 A | * | 5/1973 | Balthes ........................... 56/27.5 |
| 3,765,424 A | * | 10/1973 | Morrison et al. ............. 131/322 |
| 3,990,519 A | * | 11/1976 | Ernst ............................... 171/58 |
| 4,350,172 A | | 9/1982 | Guthrie |
| 4,353,377 A | | 10/1982 | Seymour |
| 4,836,220 A | * | 6/1989 | Miyake et al. ............... 460/130 |
| 5,331,980 A | | 7/1994 | Bailey |
| 8,074,361 B2 | * | 12/2011 | Bohlman et al. ............... 30/134 |

* cited by examiner

*Primary Examiner* — Alicia Torres
(74) *Attorney, Agent, or Firm* — Michelle Bos Legal LLC

(57) ABSTRACT

An apparatus for removing plant material from a vine. The apparatus generally comprises a support frame, a pair of counter-rotating wheels, and a vine stripping component. In an embodiment, the vine stripping component includes interchangeable stripping dies. In an additional embodiment, the apparatus is incorporated in a mobile harvesting unit. The invention further includes a method for removing plant material from vines.

8 Claims, 7 Drawing Sheets

VINE STRIPPING APPARATUS AND METHOD

CROSS-REFERENCE TO RELATED APPLICATIONS

This application is a continuation-in-part of copending U.S. patent application Ser. No. 12/319,984, filed Jan. 13, 2009.

BACKGROUND OF THE INVENTION

The invention claimed herein relates to the field of harvesting equipment. More particularly, the invention relates to a device for removing plant material from a vine so that the vine can be discarded and only the desirable plant material retained for processing. The invention is particularly useful in the harvest of hops cones ("hops") from hop vines.

Hop vines are grown on a trellis. The young hop plant is trained to grow up a support twine secured in the ground at the lower end, and to a horizontal wire at the upper end. At harvest, the hops are removed from the vines and are processed to extract components used in making beer and other products. A variety of devices have been used to harvest hops. Some provide for picking of the hops in the field. The most commonly used devices in commercial hop harvesting provide for the removal and transport of the entire hop vine and support twine to a central processing facility. At the processing facility, the hop vines are suspended one by one on a series of hooks that carry the vines into a chamber. Each vine is "combed" or "raked" to strip off the leaves and cones, which fall to a screen or conveyor. A number of processes are known for separating the cones from the leaves, stems and other debris once they are removed from the vine.

While the process described above is effective in harvesting hops, it is not ideal. One shortcoming of this process is that the vines, support twine, leaves and stems must be transported from the field to the processing facility along with the hops. Once the hops are successfully separated, the rest of the plant and support twine are destroyed. It would be advantageous to leave the unusable parts of the plant in the field rather than to incur the additional labor and transportation costs to transport them to a processing facility.

Another shortcoming of known hop harvesting devices is that it is not uncommon for hops to be missed in the harvesting process, resulting in a lower crop yield than might be possible with a more thorough harvesting device.

It is therefore an object of the present invention to provide a vine stripping apparatus useful in harvesting hops and other vine-grown agricultural products that is efficient and thorough in removal of the hops from the vine. It is a further object of the present invention to provide a vine stripping apparatus that is useful in the field, as well as at a central processing location. These objectives and others are met by the invention described in the following specification, and in the accompanying drawings.

BRIEF SUMMARY OF THE INVENTION

The invention claimed and described herein comprises an apparatus for removing plant material from a vine. The apparatus generally comprises a support frame, a pair of counter-rotating wheels, and a vine stripping component. In an embodiment, the vine stripping component includes interchangeable threaded stripping dies. In an additional embodiment, the apparatus is incorporated in a mobile harvesting unit. The invention further includes a method for removing plant material from vines.

DETAILED DESCRIPTION OF THE INVENTION

Figure 1:
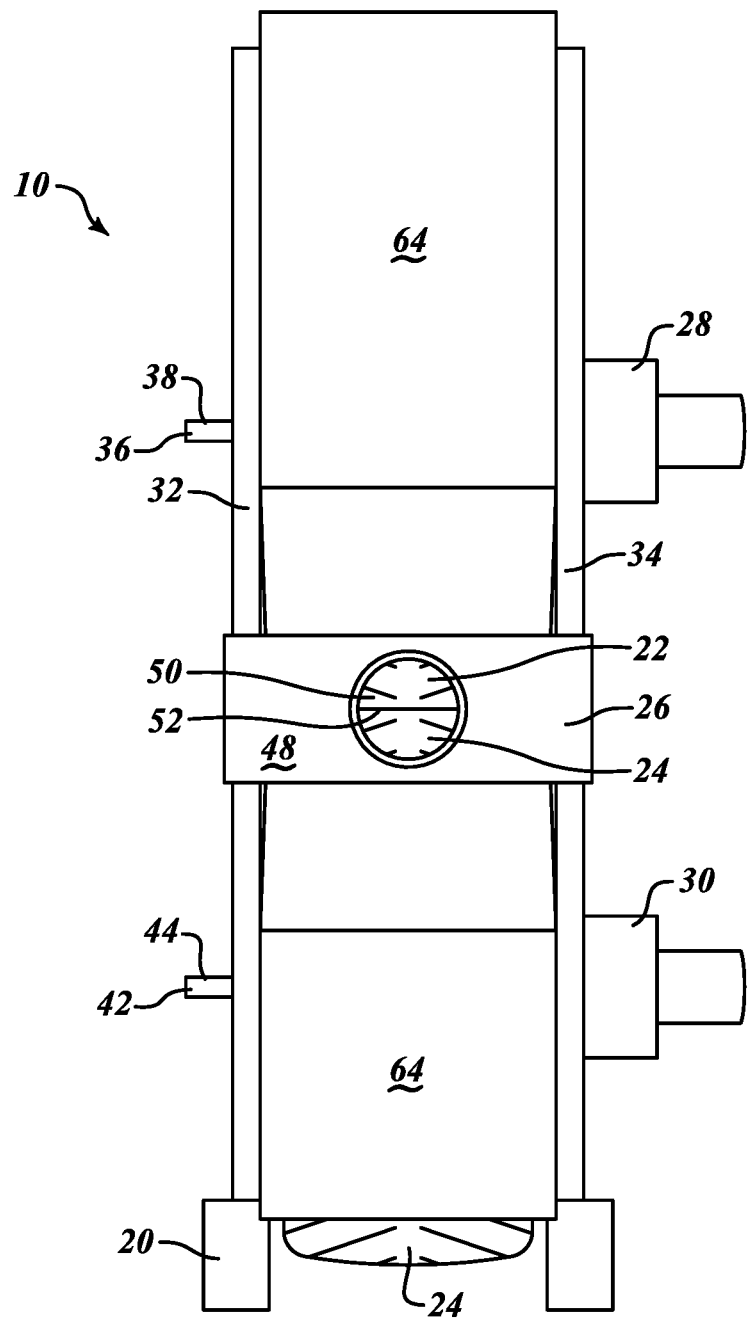
FIG. 1 is a front elevation view of the vine stripping apparatus of the present invention.
Figure 2:
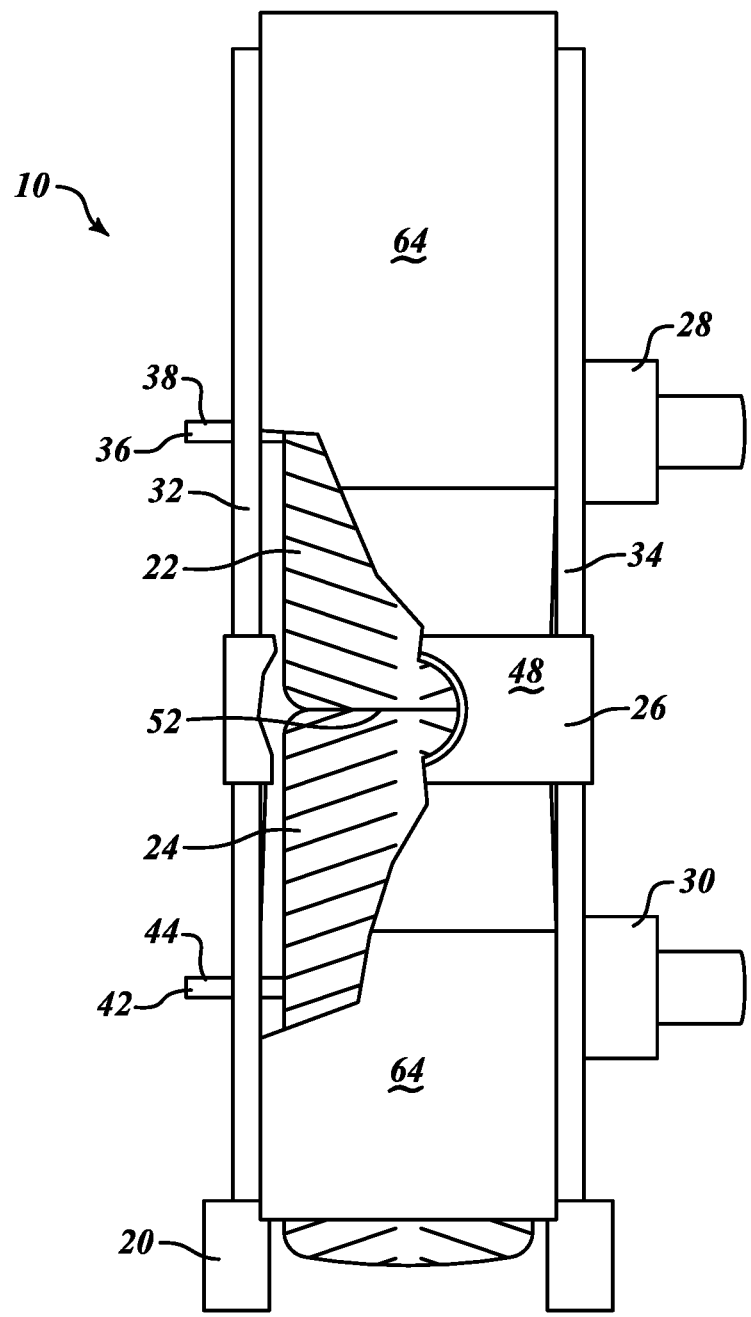
FIG. 2 is a front elevation view of the vine stripping apparatus of the present invention, shown in cut-away view.

The vine stripping apparatus claimed herein is shown in the attached drawings. With reference to FIGS. 1 and 2, the vine stripping apparatus 10 comprises a support frame 20, two counter-rotating wheels 22 and 24, a vine stripper 26, and wheel rotating means 28 and 30.

The support frame 20 comprises a structure for supporting the counter-rotating wheels 22, 24. A preferred embodiment of the support frame is shown in FIGS. 1 through 3, 9 and 10. In this embodiment, the support frame consists of a first support rail 32 and a second support rail 34, wherein the first and second support rails are substantially parallel to one another. In the embodiment shown in the drawings, the support frame is substantially vertically oriented. However, it is contemplated that the support frame may be positioned in any orientation that is convenient for the particular application. It is further contemplated that the support frame may be configured in any number of ways, so long as the support frame is adapted to receive the counter-rotating wheels in the relative position as described herein.

A pair of counter-rotating wheels are mounted on the support frame 20. In the preferred embodiment shown in the drawings, the counter-rotating wheels include a first wheel 22 having a first lateral surface 22a, and a second wheel 24 having a second lateral surface 24a. In a preferred embodiment, the counter-rotating wheels comprise pneumatic (inflatable) tires, such as conventional automotive tires, mounted on conventional automotive wheels. Conventional automotive tires and wheels, as shown in the drawings, are especially suitable for carrying out the invention because the pressure in the tires can be adjusted to an optimum level. However, any wheel having a pliable lateral surface could be used in place of the automotive tire and wheel as described and shown herein, and is considered to be within the scope of the invention. According to the invention, at least one of the wheels has a pliable lateral surface.

Figure 3:
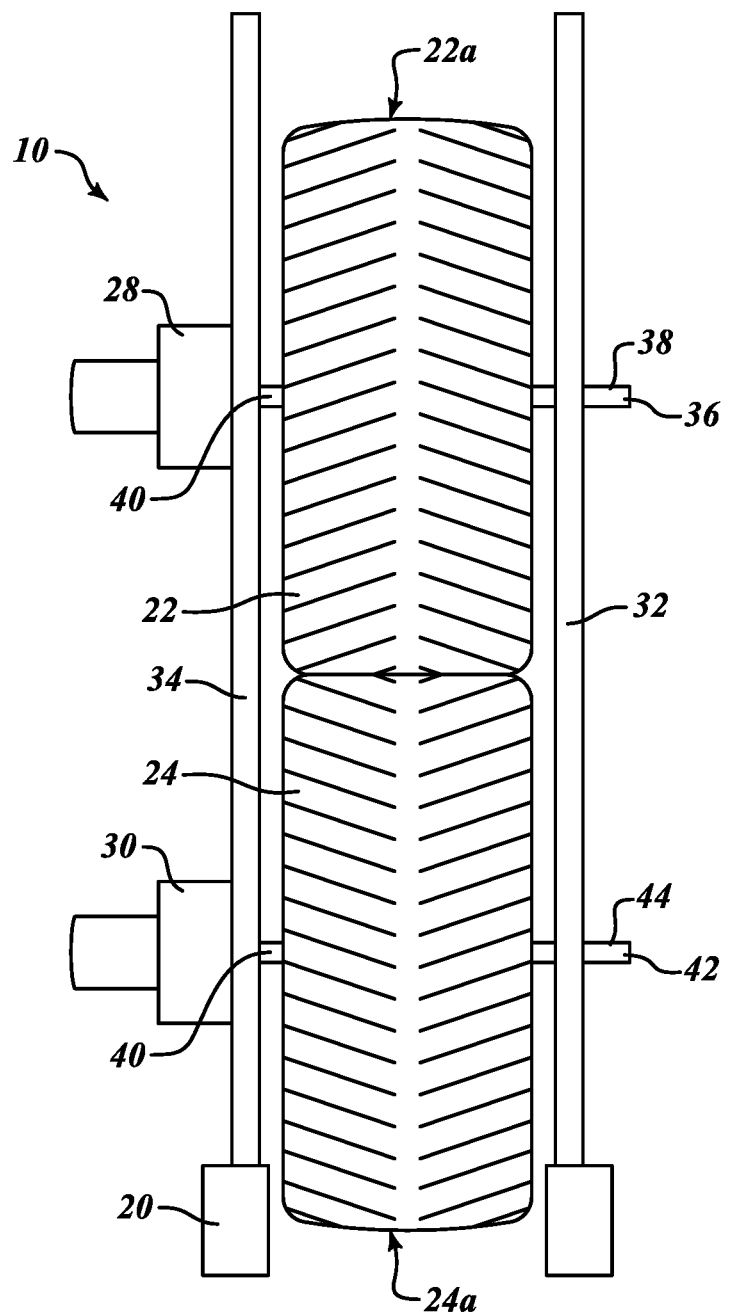
FIG. 3 is a rear elevation view of the vine stripping apparatus of the present invention.
Figure 4:
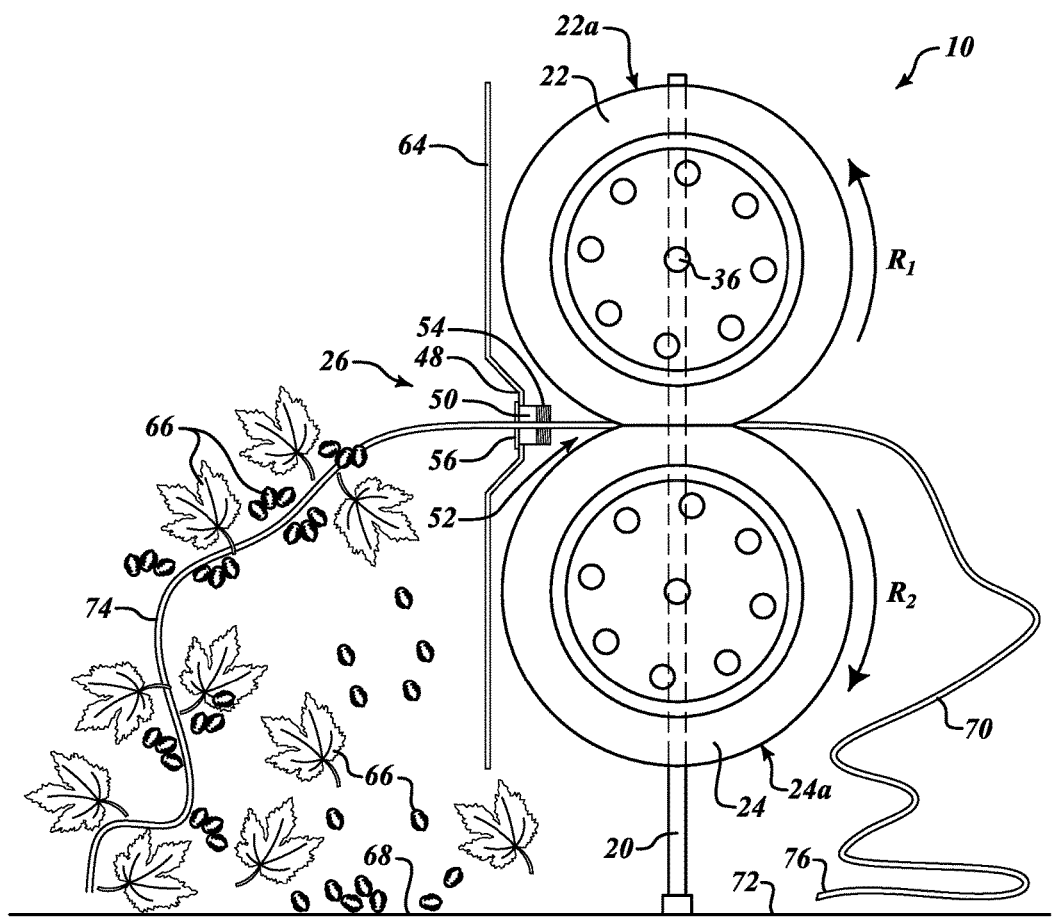
FIG. 4 is a side section view of the vine stripping apparatus of present invention.
Figure 5:
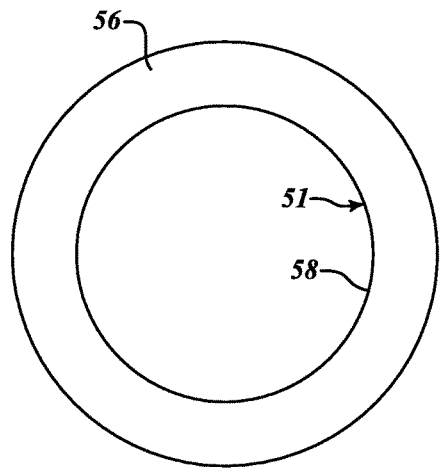
FIG. 5 is a plan view of a first embodiment of a threaded stripping die of the present invention.
Figure 6:
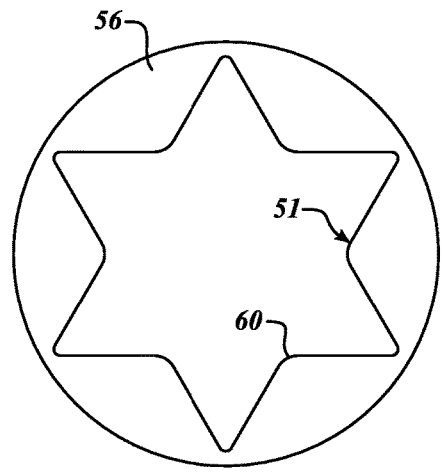
FIG. 6 is a plan view of a second embodiment of a threaded stripping die of the present invention.
Figure 7:
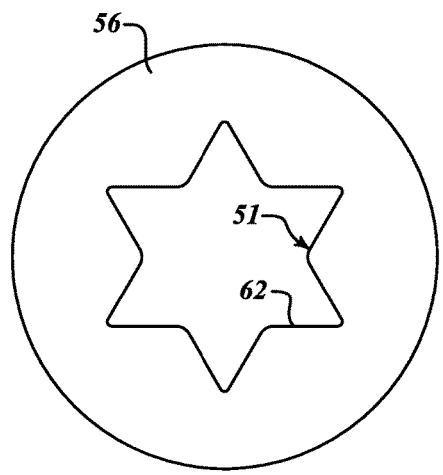
FIG. 7 is a plan view of a third embodiment of a threaded stripping die of the present invention.

The first wheel 22 and the second wheel 24 are rotatably secured to the support frame 20 on a first axle 36 and a second axle 42, respectively. The first axle has a first end 38 and a second end 40. The second axle has a first end 44 and a second end 46. Each axle first end is rotatably secured to the first support rail 32 of the support frame. Each axle second end is functionally engaged with the wheel rotating means 28, 30 mounted on the second rail 34 of the support frame. The first axle and the second axle are parallel to and spaced apart from one another, such that the lateral surfaces 22a, 24a of the counter-rotating wheels are compressed against one another in substantially full contact with one another, as shown in FIGS. 2, 3 and 4. It has been found by the inventors that the compression of the counter-rotating wheels against one another is critical to the function of the vine stripping apparatus. As will be described more fully below, the counter-rotating wheels grip the vine to be stripped, and provide pulling force to draw the vine through the vine stripper 26 as the wheels are rotated at relatively high speed. The grip on the vine must be secure and not disposed to slipping or crushing the vine. Pneumatic tires are uniquely suited to this purpose because the pressure in the tires, and thus the gripping force, is adjustable by simply increasing or decreasing the pressure in the tires. At the appropriate tire pressure, the surface of the pneumatic tires will conform to accommodate the shape of the vine while gripping it securely as pulling force is applied and plant material is stripped away by the vine stripper. Pneumatic tires inflated to about 30 to 45 psi have been found to be most effective in carrying out the invention.

In a preferred embodiment, the vine stripper 26 is affixed to the support frame 20, although this is not a requirement of the invention. A freestanding or alternative support for the vine stripper may also be employed. The vine stripper comprises at least one stripping orifice 50. The stripping orifice receives an end of the vine to be stripped, and is the point at which the plant material is removed from the vine during the operation of the vine stripping apparatus. In a preferred embodiment, the stripping orifice is formed in a stripping orifice plate 48. The stripping orifice has a blunt, substantially planar stripping edge 51. The inventors have found that the blunt edge allows the plant material to be removed from the vine without inadvertently severing the vine. In operation, vines are pulled very quickly through the stripping orifice by the counter-rotating wheels, and in the process tend to wave and move about. The vines are bulky, rope-like, and somewhat unwieldy. A sharp stripping edge would certainly sever the vine, and would therefore be unworkable for the present invention.

Figure 8:
FIG. 8 is a side view of a threaded stripping die of the present invention.

FIGS. 4 and 8 show a side view of the stripping orifice 50; in these figures it can be seen that the stripping edge 51 is substantially planar and does not protrude outwardly from the stripping orifice. This feature adds both functionality and safety to the invention design. The substantially flush stripping edge eliminates another potential cause of vine breakage when the vine stripping apparatus is in use. A protruding point or notch in the stripping orifice is more likely to catch the vine and cause it to be severed by the stripping orifice. The flush stripping orifice is also a significant safety feature of the present invention. In use, the vine stripping apparatus may be mounted on a mobile harvesting unit. An operator rides on the mobile harvesting unit and feeds vines into the vine stripping apparatus while the unit is in motion. A protruding blade or teeth on the stripping orifice would surely lead to operator injury. The stripping orifice is large enough to allow a vine and support twine to pass through, but small enough to prevent the passage of the majority of leaves and other plant material, such as hops. The stripping orifice is also sized to prevent the operator's hand from inadvertently being pulled through.

As shown in FIGS. 1, 2 and 4, the stripping orifice 50 is positioned between the first axle 36 and the second axle 44, centered proximate a contact point 52 where the first lateral surface 22a of first wheel 22 and the second second lateral surface 24a of second wheel 24 contact one another. Preferably, the stripping orifice is located in close proximity to the contact point 52, as best seen in FIG. 4. In an embodiment in which the wheels are approximately 24 inches in diameter and approximately 8½ inches in width, placement of the stripping orifice approximately 6 inches from the contact point is ideal. The inventors have found that the placement of the stripping orifice near the contact point minimizes the likelihood that the vine will break during the stripping operation, and allows the vine stripping apparatus to be operated at higher speeds.

Preferably, the stripping orifice 50 comprises a threaded opening 54 in the stripping orifice plate 48, and a complementary threaded stripping die 56 having a substantially cylindrical body receivable in the threaded opening. In this embodiment, several interchangeable stripping dies, such as the ones shown in FIGS. 5, 6 and 7 and 8, can be employed. In an additional preferred embodiment (not shown), the stripping orifice comprises an opening in the stripping orifice plate 48 and a channel affixed on the stripping orifice plate for slidably receiving a stripping die having a substantially planar rectangular body.

The size and configuration of the stripping orifice can be matched to the particular species or variety of plant being harvested. It has been found that certain shapes are more effective at catching and removing plant material from a vine as it pulled through the stripping orifice 50. The circular opening 58 of the threaded stripping die shown in FIG. 5, and the "star" shaped openings 60 and 62 of the threaded stripping dies shown in FIGS. 6 and 7 have been used with success with hop vines. In particular, the star shape has been found to be especially effective in removing plant material, due to the multiple "notches" created by the points of the star.

The purpose of the counter-rotating wheels, first wheel 22 and second wheel 24, is to grasp and pull the vine and twine through the stripping orifice 50. In order to accomplish this pulling action, the first wheel 22 is rotated in a first direction $R_1$, and the second wheel 24 is rotated in a second direction $R_2$, opposite the first direction. The counter-rotation of the wheels is best shown in FIG. 4, wherein it can be seen that the first wheel is rotated in a counterclockwise direction, and the second wheel is rotated in a clockwise direction. The result of the counter-rotational relationship of the wheels is that at the contact point 52, both wheels are rotating in a direction away from the stripping orifice 50.

The rotating means 28 and 30 shown in FIGS. 1 through 4 provide power to effect the rotation of the wheels 22, 24 as described above. In a preferred embodiment, the rotating means are hydraulic motors, although other types of power sources are contemplated, including electric power, combustible fuel, and manual power.

In a preferred embodiment shown in FIGS. 1 and 2, the vine stripping apparatus 10 further includes a cowling 64, which provides a safety barrier to protect the operator from the rotating wheels 22, 24.

In use, the vine stripping apparatus 10 rapidly and thoroughly removes substantially all plant material 66 from a vine and deposits it in a collection location 68, and ejects the stripped vine 70 in a disposal location 72. See FIGS. 4 and 9. The process of stripping a vine using the vine stripping apparatus described herein includes first obtaining an unstripped vine 74 that has been severed from its root. As referred to herein, an "unstripped vine" is a vine that has not been stripped of leaves and other plant material, and may or may not include the support twine on which the vine was grown. In the case of hop vines, both the root end and trellis end of the vine and twine must be severed, leaving a completely detached unstripped vine. The wheel rotating means 28, 30 are engaged to turn first wheel 22 in direction $R_1$ and second wheel 24 in direction $R_2$. The root end 76 of the unstripped vine is inserted into the stripping orifice 50 until it reaches the wheel contact point 52. As the wheels turn, the root end of the unstripped vine is grasped between the wheels and the vine is pulled through the stripping orifice. Plant material 66 growing on the vine is too bulky to pass through the stripping orifice, and is therefore pulled off of the vine by the stripping orifice and deposited in the collection location 68. As the unstripped vine is continuously advanced, it is stripped clean and the stripped vine 70 is deposited in the disposal location 72. The stripping process occurs rapidly—under ideal conditions, approximately thirty 18-foot vines can be stripped per minute.

An advantage of the process described herein is that nearly all of the plant material 66 is removed from the vine, resulting in very little waste. An additional advantage of the process is that the plant material sustains very little damage during this stripping process. This is due to the "self-cushioning" effect that results as the vine passes through the stripping orifice 50. The plant material tends to accumulate against the stripping orifice, forming a cushion against which additional plant material is pressed as the vine is pulled through.

Figure 9:
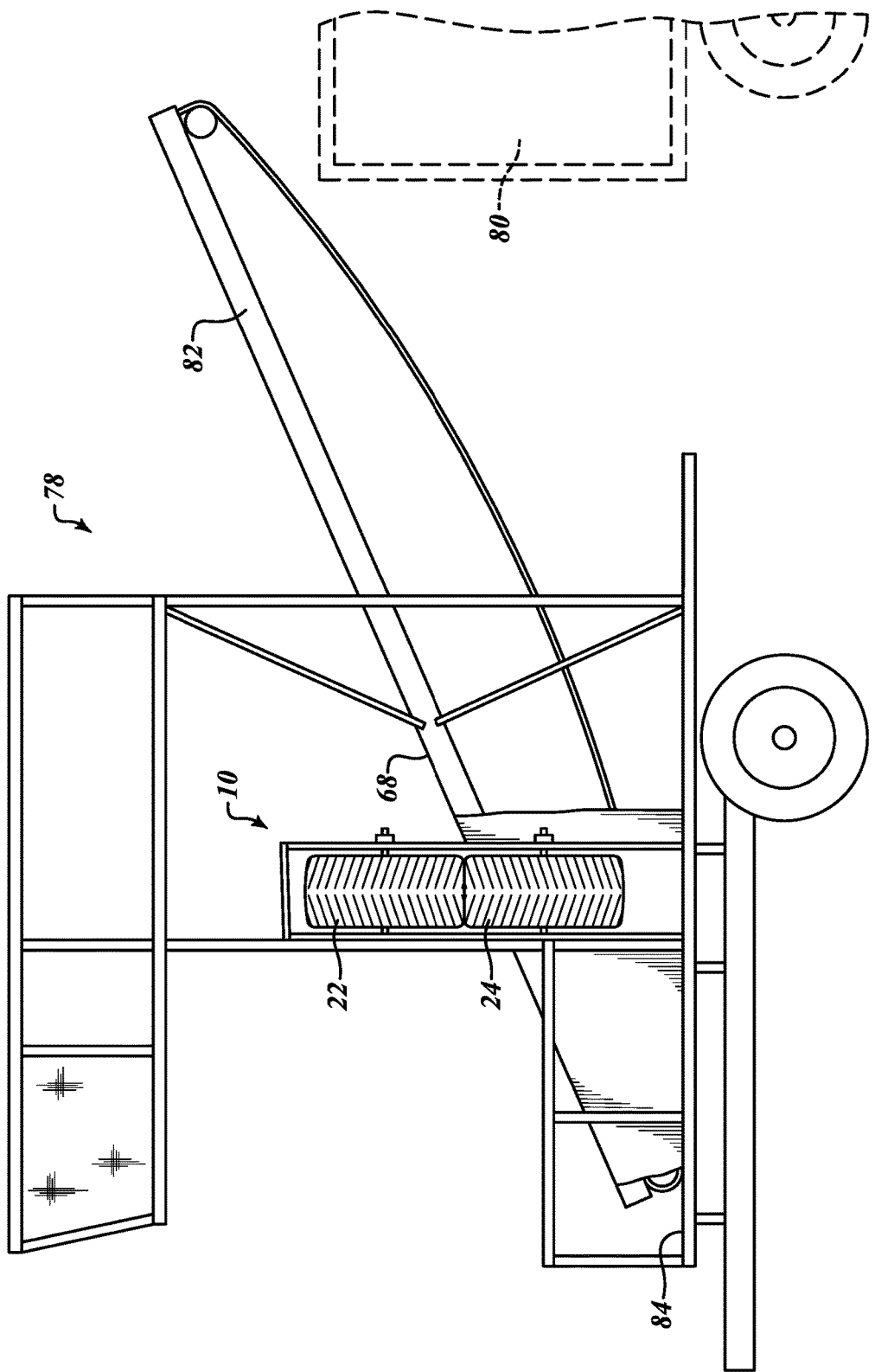
FIG. 9 is a side elevation view of an embodiment of the vine stripping apparatus, shown mounted on a mobile harvesting unit suitable for use in a hop field.
Figure 10:
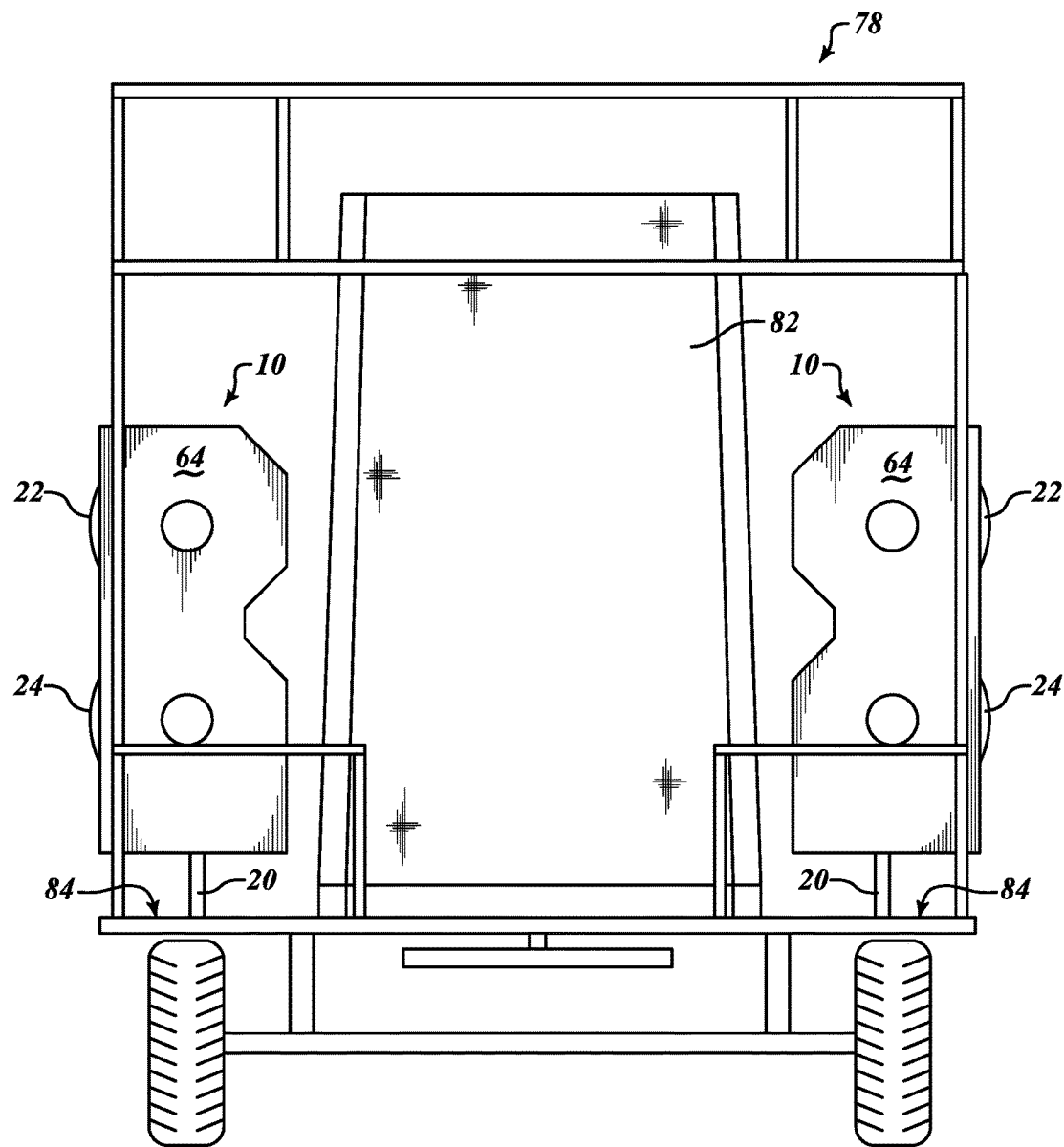
FIG. 10 is a rear elevation view of an embodiment of the vine stripping apparatus, shown mounted on a mobile harvesting unit suitable for use in a hop field.

In an embodiment of the invention, at least one vine stripping apparatus 10 is mounted to a mobile harvesting unit 78 suitable for use in the field where the crop to be harvested is grown. The mobile harvesting unit is used in combination with a receptacle 80 for collecting the harvested plant material 66 and transporting it to a central processing facility for further sorting and processing. The mobile harvesting unit may be adapted to be towed by another powered vehicle, as shown in FIGS. 9 and 10, or it may include an integrated power source for moving through the field. In addition, the mobile harvesting unit or the powered vehicle may include a power source for providing power to the rotating means 28, 30 of the vine stripping apparatus.

The mobile harvesting unit 78 is adapted to receive one or more vine stripping apparatuses, as shown generally in FIGS. 9 and 10. A conveyor 82 is provided in the bed of the vehicle for receiving the plant material 66 and carrying it to be deposited in the receptacle 80. Each vine stripping apparatus 10 is positioned on the vehicle so that the vine stripper 26 is substantially oriented toward the conveyor. An operator platform 84 in the vehicle provides a secure location for the operator to stand as he or she feeds unstripped vines 74 into the vine stripping apparatus 10.

In compliance with the statutes, the invention has been described in language more or less specific as to structural features and process steps. While this invention can be embodied in different forms, the specification describes and illustrates preferred embodiments of the invention. It is to be understood that this disclosure is an exemplification of the principles of the invention, and is not intended to limit the invention to the particular embodiments described. Those with ordinary skill in the art will appreciate that other embodiments and variations of the invention, which employ the same inventive concepts as the invention, are possible. Therefore, the invention is not to be limited except by the following claims, as appropriately interpreted in accordance with the doctrine of equivalents.

The invention claimed is:

1. An apparatus for removing plant material from a vine, the apparatus comprising:
   a support frame;
   a first wheel mounted on the support frame, the first wheel having a first lateral surface, and a second wheel mounted on the support frame, the second wheel having a second lateral surface, wherein the first wheel and the second wheel are pneumatic tires, and further wherein the first lateral surface and the second lateral surface are compressed against one another in substantially full contact at a contact point;
   wheel rotating means for rotating the first wheel in a first direction and the second wheel in a second direction opposite the first direction; and
   a vine stripper, the vine stripper comprising a stripping orifice, wherein the stripping orifice is formed in a substantially planar surface and has a blunt stripping edge, and wherein the stripping orifice is proximate the contact point of the first lateral surface and the second lateral surface;
   wherein the stripping orifice is formed in a stripping orifice plate, and the stripping orifice further comprises a stripping die and a means for removably securing the stripping die on the stripping orifice plate.

2. The apparatus of claim 1, wherein the stripping die comprises a substantially cylindrical body having a threaded external surface, and wherein the means for removably securing the stripping die on the stripping orifice plate comprises a corresponding threaded opening in the stripping orifice plate.

3. The apparatus of claim 1, wherein the stripping die comprises a substantially planar rectangular body, and wherein the means for removably securing the stripping die on the stripping orifice plate comprises a channel formed on the surface of the stripping orifice plate for slidably receiving the stripping die.

4. The apparatus of claim 1, wherein the stripping orifice is substantially star-shaped.

5. An apparatus comprising:
   a vine stripper comprising a stripping orifice formed in a substantially planar surface and having a blunt stripping edge; and
   a pair of counter-rotating pneumatic tires, each tire having a lateral surface, the tires mounted in such a way as to place the lateral surfaces in substantially full compressed contact to form a contact point, wherein the contact point is aligned with the stripping orifice; and
   wherein the stripping orifice is formed in a stripping orifice plate, and the stripping orifice further comprises a stripping die and a means for removably securing the stripping die on the stripping orifice plate.

6. A method for removing plant material from a hop vine comprising pulling the hop vine through a stripping orifice formed in a substantially planar surface and having a blunt stripping edge, the stripping orifice sized to allow passage of the hop vine but not the plant material.

7. The method of claim 6, wherein the hop vine is pulled through the stripping orifice by a pair of counter-rotating wheels.

8. The method of claim 6, wherein the hop vine is pulled through the stripping orifice by a pair of counter-rotating pneumatic tires.

* * * * *